June 22, 1965 A. POLLAK 3,191,091

VERTICAL DEFLECTION TELEVISION CIRCUIT

Filed July 17, 1961 3 Sheets-Sheet 1

INVENTOR
Alfred Pollak

BY George H. Spencer
ATTORNEY

VERTICAL DEFLECTION TELEVISION CIRCUIT

Filed July 17, 1961 3 Sheets-Sheet 2

KΩ = $10^3$ OHMS
MΩ = $10^6$ OHMS
μF = $10^{-6}$ FARAD
nF = $10^{-9}$ FARAD
pF = $10^{-12}$ FARAD

INVENTOR
Alfred Pollak

BY George H. Spencer
ATTORNEY

June 22, 1965 A. POLLAK 3,191,091

VERTICAL DEFLECTION TELEVISION CIRCUIT

Filed July 17, 1961 3 Sheets-Sheet 3

INVENTOR

Alfred Pollak

BY George H. Spencer

ATTORNEY

United States Patent Office 3,191,091

Patented June 22, 1965

3,191,091
VERTICAL DEFLECTION TELEVISION CIRCUIT

Alfred Pollak, Hannover, Germany, assignor to Telefunken Patentverwertungs-G.m.b.H., Ulm (Danube), Germany Filed July 17, 1961, Ser. No. 124,477
Claims priority, application Germany, July 20, 1960, T 18,718
10 Claims. (Cl. 315—27)

The present invention relates generally to circuits for cathode ray tubes which generate saw tooth current curves, and especially for the vertical deflection of one or several electron beams in the picture tube of a television receiver, wherein during the forward cource of the saw tooth curve the ohmic voltage is high compared to the inductive voltage.

In some cathode ray tube (CRT) circuits, the deflecting coils at the line frequency, during the forward deflection of the saw tooth deflecting current, are mostly inductive. This is not true for the lower frequencies of vertical deflection. In the latter case, the deflecting coils provide a substantially ohmic resistance having but a small inductive component. However this is not always true with the more rapid fly-back pulse.

To produce a linear increase of the coil current during forward deflection, a linear increase of the coil voltage is also necessary. This increase is provided by a tube either coupled directly to the coil or through a transformer. The control voltage is produced by an RC-circuit which discharges through a tube, such as a blocking oscillator. When using transformer coupling, it is usual to employed relatively small transformers, for reasons of economy, and because of this the deflecting current curve in the coils deviates considerably from a saw tooth curve.

It is known that in order to achieve a linear rising flank of the saw tooth current curve, it is advantageous to provide the charging capacitor with a frequency dependent negative feedback from the transformer or from the anode circuit of the tube. Such a negative feedback has been provided in known circuits by means of a capacitive voltage divider connected between the transformer, or anode, and the charging capacitor. The tapping point of this voltage divider is connected to a point of substantially fixed voltage through one or several resistors. By a substantially fixed voltage, is meant a voltage which has only slight fluctuations with respect to the voltage which has only slight fluctuations with respect to the voltage on the other side of the resistance. The capacitive voltage divider is so designed that the first capacitor in the negative feedback path, together with the resistance connected in the shunt path forms a differentiating section which reduces the negative feedback for the lower frequencies. By this means the defects and deviations from a saw tooth curve brought about by the finite inductance of the transformer, are corrected. The remainder of the capacitive voltage divider forms an integrating section which renders the negative feedback voltage proportional to the current flowing in the deflecting coils and filters out the fly-back peaks.

When using a CRT having a radius of screen curvature which is greater than the distance from the screen to the center of deflection of the vertical deflecting coils, there is tangent error (flat screen) distortion. To obviate this distortion the deflecting current is rendered S-shaped, by altering the shape of the curve of the control grid voltage of the tube in whose anode circuit the coil is situated, while the effective voltage of the charging circuit is altered. The S-shape distortion of the control voltage curve has also been provided in the past by connecting the remote end of the charging resistor with respect to the capacitor through an integrating circuit with the anode of the controlled tube. The time constant of this circuit is at least double the duration of the period of one scanning.

However, with this circuit it is not possible to compensate for the tangent error while operating the transformer at optimum conditions. The tangent error distortion could be compensated for in the lower half of the picture by providing a lesser preliminary correction of the distortion of the control voltage and compensating for the expansion thus caused in the upper half of the picture through the adjustable integrating section. However, the region of the picture affected by this section amounts to only a few lines at the upper border of the picture and this method is therefore not useful for correction of the tangent error distortion.

With these defects of the prior art in mind, it is a main object of this invention to provide a circuit for eliminating tangent error distortion.

Another object is to provide such a circuit wherein there is predistortion of the control potential to aid in correcting tangent error distortion and which may be adjusted to be a minimum or even eliminated.

These objects and others ancillary thereto are accomplished according to preferred embodiments of the invention, wherein a circuit is provided for eliminating tangent error distortion and rendering the rising flank of the saw tooth curve linear. The circuit includes a frequency dependent negative feedback section coupled to a capacitive voltage divider. A linearity regulator is connected between the tapping point of the capacitive voltage divider and a substantially fixed voltage for correcting the tangent error distortion, and is connected as well with one or more circuit elements, providing an additional predistortion of the control voltage. This is done in such a manner that when the linearity regulator is short-circuited this predistortion is disconnected or at a minimum.

In a preferred embodiment an additional resistance is connected between the anode of the tube feeding the coils and a tapping point of a first resistance connected between the capacitive voltage divider and the point having a substantially constant voltage. The first resistance is variable so that the balance between the linearity in the lower and upper halves of the picture and the compensation for the tangent error distortion may be adjusted. Thus, an undistorted portion of the anode A.C. voltage of the tube is applied to the tapping point of the voltage divider, i.e., the integrating section. This portion of the A.C. voltage reduces the frequency dependent negative feedback in the latter portion of the curve corresponding to the lower border of the picture, and increases this feedback in the first portion of the forward deflection of the saw tooth curve. When the regulator is short-circuited the undistorted portion for the negative feedback is zero.

Additional objects and advantages of the present invention will become apparent upon consideration of the following description when taken in conjunction with the accompanying drawings in which.

Figure 1:
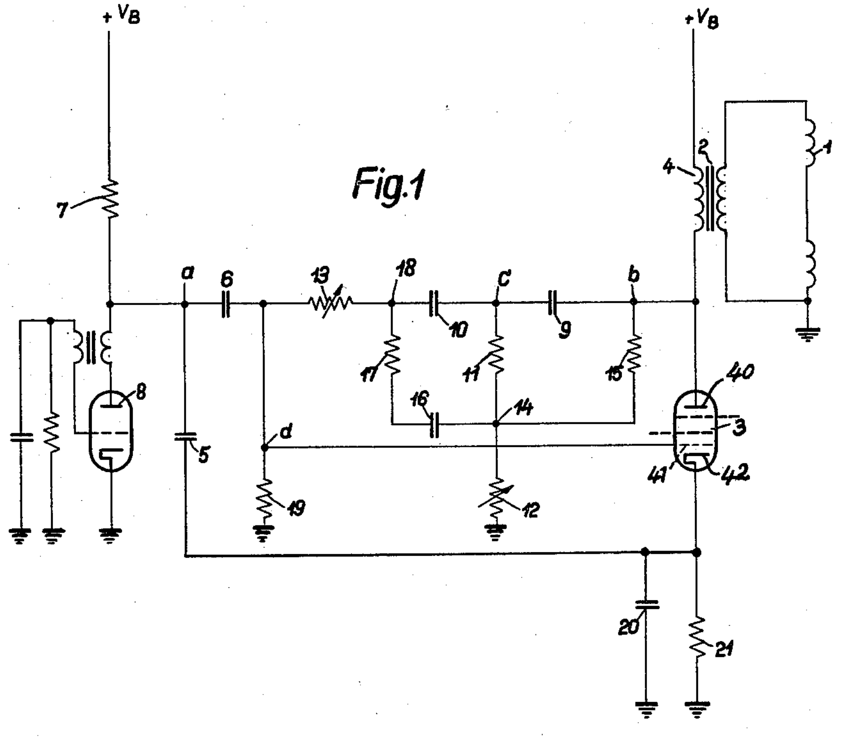
FIGURE 1 is a circuit diagram of the vertical deflection circuit comprising the present invention.

With more particular reference to the drawings, FIGURE 1 illustrates a theoretical vertical deflection circuit wherein the deflecting coils 1 are connected through a transformer 2 with the anode 40 of an amplifying tube 3. The anode 40 is connected with the operating voltage $+V_B$ through the primary winding 4 of transformer 2. A control voltage having a saw tooth shaped curve is fed from a charging capacitor 5 through a coupling capacitor 6 to the control grid of the amplifier tube. This voltage is obtained from RC-circuit 7, 5 whereby capacitor 5 is charged through resistor 7 and discharged through blocking oscillator 8.

A negative feedback section or channel is connected between anode 40 and control grid 41 of tube 3 for rendering linear the current which flows through deflecting coils 1 and which has a saw tooth shaped curve.

This feedback section comprises a capacitive voltage divider including capacitors 9, 10, and two resistors 11, 12 connected between the point *c*, which is the junction of capacitors 9 and 10 and ground. Resistor 12 is variable. Furthermore, a variable resistor 13 is connected between the capacitor 10 and coupling capacitor 6 or charging capacitor 5. A resistor 15 is connected between junction point 14 of resistors 11, 12 and anode 40 or point *b* of the negative feedback channel to attenuate the voltage in differentiating sections 9, 11 and superposes an undistorted portion of the voltage, having a saw tooth curve, from the tube 3 on point *c*. Junction point 14 may be connected with junction point 18 of capacitor 10 and resistor 13 through capacitor 16 and resistor 17. A grid leak resistor 19 is provided for tube 3. Resistor 21 and capacitor 20 form the RC-section for the cathode circuit of tube 3. One terminal of the charging capacitor is connected to the junction of the RC-section 20, 21, with the cathode 42 of the tube 3.

The operation of this circuit will now be explained with reference to the curves of FIGURE 2. To eliminate tangent error distortion, the voltage at charging capacitor 5, which is rising according to an *e*-function, is distorted by a frequency dependent negative feedback to such an extent that the saw tooth curve of the current in the coils considered from the center of the picture becomes continuously decreased relative to the linear course. An S-shaped component is superimposed on the linear portion of the curve. The curve of the voltage due to the negative feedback at charging capacitor 5 is illustrated by curve *a* of FIGURE 2. The curve of the anode A.C. voltage of tube 3 at point *b* is illustrated in curve *b*. This voltage is differentiated by RC-section 9, 11, 12, so that the low frequencies in the negative feedback section become ineffective, i.e., attenuated.

Figure 2:
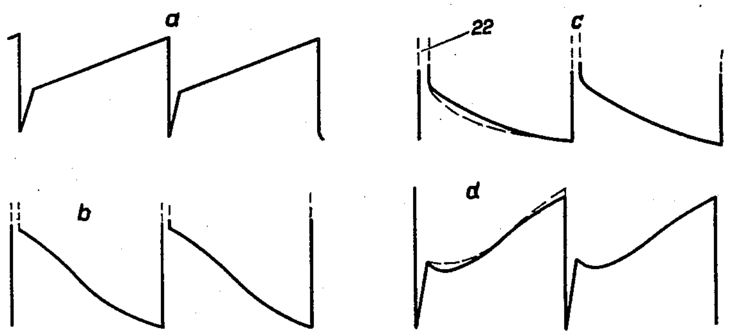
FIGURE 2 are curves provided by various sections of the circuit of FIGURE 1 and which are labeled *a, b, c,* and *d.*

By means of integrating sections 13, 6, 5, the fly-back pulse, such as 22 in curve *c*, FIGURE 2, is filtered out and the negative feedback voltage fed to the control grid 41 is rendered approximately proportional to the current in the deflection coils. Furthermore, the anode A.C. voltage passes through resistor 15 to tapping point 14 of voltage divider 11, 12. Thus, the resistors 12, 15 serve as a voltage divider for the undistorted anode A.C. voltage and they determine the value of the portion of this voltage fed to tapping point *c*. The voltage curve at point *c* is shown in curve *c* of FIGURE 2. The dashed line shows the curve after resistor 15 has been inserted into the circuit.

The greater steepness in the first portion of the forward deflection is a result of both the portion of the anode A.C. voltage as well as the increased differentiation action of section 9, 11, 12. This is required to attain a gradually decreasing crowding of the lines from the start to the middle of the picture and this is desired for correction of the tangent error distortion. Inasmuch as the regulator 12 acts as a balancing regulator, the intensified differentiation produced for the upper half of the picture at the same time influences the lower half of the picture. In known circuits, which do not use resistor 15, such a selection of the differentiating section would manifest itself as a marked expansion of the lower half of the picture. However, with the use of resistor 15, an additional frequency dependent negative feedback is introduced which has a greater effect in the upper half of the picture than in the lower half of the picture. This is so because the anode A.C. voltage is greater.

When regulator 12 is short-circuited, the greatest effect is obtained from the differentiating section 9, 11, 12 and the cutoff frequency is at its highest. Also, the crowding of the lines at the beginning of the picture and the expansion of the lines at the end of the picture are the greatest. The above-mentioned portion of the undistorted anode A.C. voltage is zero. If the value of resistance 12 is increased, the differentiation action is lessened and the expansion of the lines is uniformly reduced. Also the undistorted portion of the anode A.C. voltage at point 14 becomes noticeable and this primarily has a delaying effect on the upper half of the picture. Curve *d* of FIGURE 2 shows the control grid voltage of tube 3.

Figure 3:
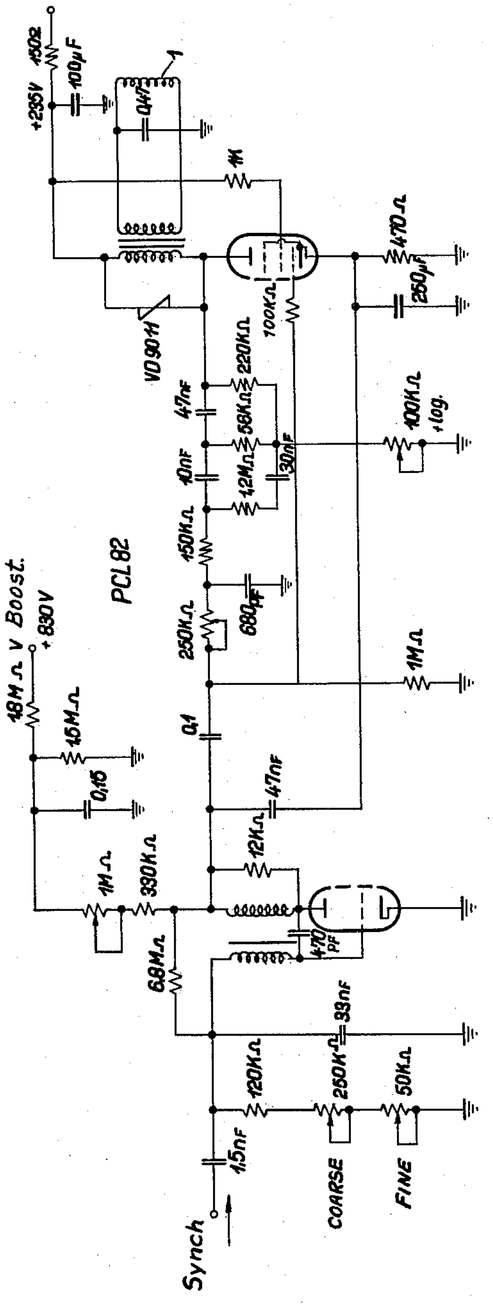
FIGURE 3 is a circuit diagram of a vertical deflection circuit which has actually been constructed and used.

FIGURE 3 illustrates a circuit constructed in accordance with the present invention which has actually been constructed and used. The values of the various components are indicated in the drawing.

Figures 4, 6:
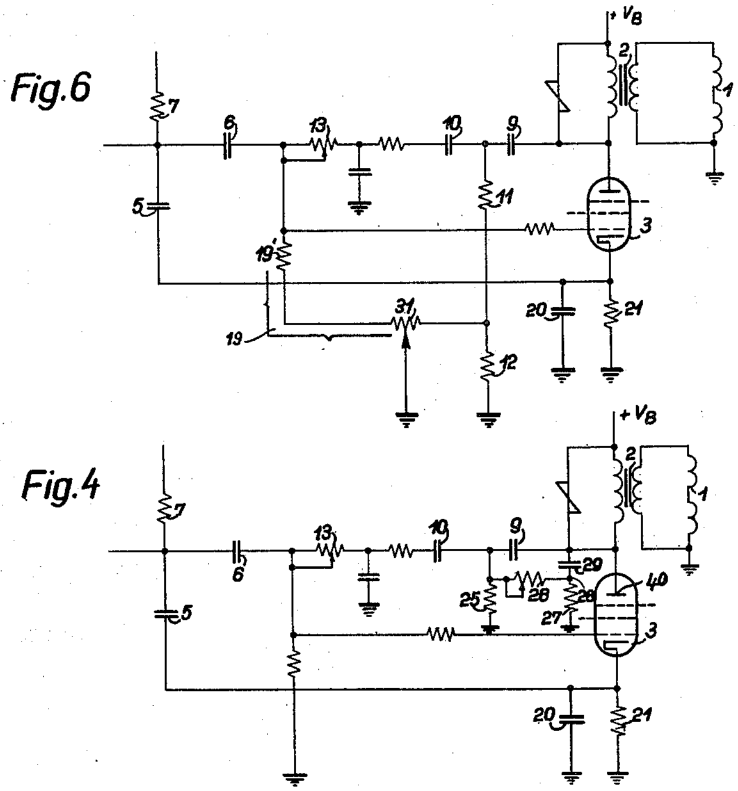
FIGURE 4 is a circuit diagram of another embodiment of the invention.
FIGURE 6 is a circuit diagram of still another embodiment.

FIGURE 4 illustrates a further embodiment of the invention wherein corresponding elements are identified with the same reference numerals used in connection with FIGURE 1. In this embodiment the linearity regulator is provided in the shunt branch of the capacitive voltage dividers 9, 10. This is accomplished by connecting a resistor 25 in parallel with a series circuit including a variable resistor 26 and a resistor 27. The tapping point 28 of this series circuit located between resistors 26 and 27 is connected with anode 40 through capacitor 29.

When regulator 26 is short-circuited, capacitors 9 and 29 are connected in parallel. In this case the resistors 25 and 27 are also connected in parallel and the differentiating section has its highest cutoff frequency. When resistor 26 is increased the total resistance in the shunt branch increases and capacitor 29 has less effect so that the cutoff frequency continuously becomes lower. This occurs because the total resistance is increasing faster than the capacitance is decreasing. By this means, the lines in the lower half of the picture are crowded together more than the lines in the upper half of the picture are expanded, and, considering the entire picture, the middle is expanded and the upper and lower halves are compressed.

In selecting values of resistors 25, 26, and 27, resistor 25 must be large with respect to resistor 27, and the parallel circuit including these resistors should be about 100,000 ohms, while the parallel circuit including capacitors 9 and 29 should be about 33 nanofarads (1 nanofarad equals $10^{-9}$ farads).

Figure 5:
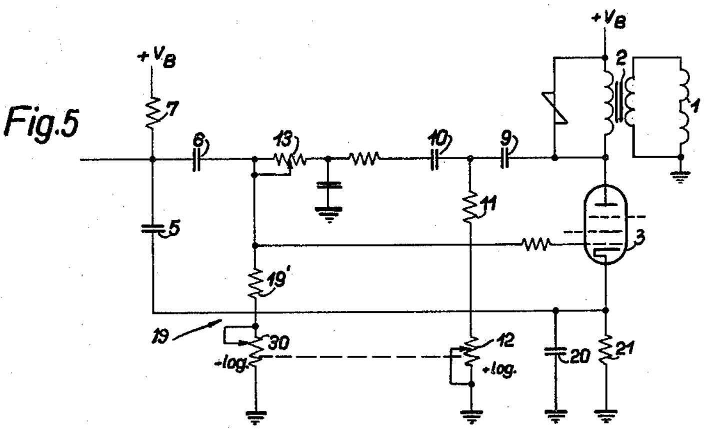
FIGURE 5 is a circuit diagram of a further embodiment.

FIGURE 5 illustrates another embodiment of the invention wherein the linearity regulator 12 is mechanically coupled with a variable resistor 30 which together with resistor 19' forms the grid leak resistance 19. Thus, the linearity of the control voltage fed to the control grid of tube 3 may be varied in accordance with the position of the linearity regulator.

FIGURE 6 illustrates a further embodiment wherein on the tap of the ohmic voltage divider connected in the shunt circuit of the capacitive voltage divider, a grid leak resistance 19 is connected. Grid leak resistance 19 includes a potentiometer 31 directly connected to the tap, as well as a resistor 19'. The movable contact of this potentiometer is connected with the substantially constant voltage which is ground.

In the circuits of FIGURES 5 and 6 resistor 15 of FIGURE 1 may be inserted if desired.

It will be understood that the above description of the present invention is susceptible to various modifications, changes and adaptations, and the same are intended to be comprehended within the meaning and range of equivalents of the appended claims.

What is claimed is:

1. A circuit arrangement for producing a current having a saw tooth shaped curve for the deflection of an electron beam of a CRT wherein the radius of curvature of the screen is greater than its distance from the center of deflection, comprising an output circuit having deflecting coils presenting an ohmic load with an inductive component for the saw tooth current, tube means connected to said output circuit and having an anode and a control grid for generating a saw tooth control voltage; capacitive voltage divider means including two capacitors connected to the tube anode for predistorting the saw tooth control voltage with frequency dependent negative feedback which is fed to the control grid; a variable linearity regulator having a tapping point and connected to a tapping point of the capacitive voltage divider between the two capacitors and a substantially fixed voltage for correcting the tangential distortion; and at least one circuit element means connected with said regulator to bring about an additional predistortion of the control voltage so that when the linearity regulator is short-circuited the additional predistortion is minimal.

2. A circuit arrangement according to claim 1, comprising an ohmic resistance connected between said tube anode and the tapping point of the linearity regulator.

3. A circuit arrangement according to claim 1, comprising a resistance forming a shunt branch with respect to the capacitive voltage divider; a series circuit including a variable and a fixed resistance connected in parallel with the shunt branch resistance; and a capacitor connected between the tapping point of said series circuit and the tube anode.

4. A circuit arrangement according to claim 1, comprising a resistance forming a shunt branch with respect to the capacitive voltage divider; a grid leak resistance including a fixed and a variable resistor, connected to the shunt branch resistance, a movable contact of said variable resistor being connected to ground.

5. A circuit arrangement according to claim 1, comprising a variable grid leak resistor connected between ground and the control grid, said linearity regulator being mechanically coupled to the grid leak resistor for simultaneous adjustment.

6. A circuit arrangement for producing a current having a saw tooth shaped curve for the deflection of an electron beam of a CRT wherein the radius of curvature of the screen is greater than its distance from the center of deflection, comprising an output circuit having deflecting coils presenting an ohmic load with an inductive component for the saw tooth current, tube means connected to said output circuit and having an anode and a control grid for generating a saw tooth control voltage; capacitive voltage divider means including two capacitors connected to the tube anode for predistorting the saw tooth control voltage with frequency dependent negative feedback which is fed to the control grid; a variable linearity regulator having a tapping point and connected to a tapping point of the capacitive voltage divider between the two capacitors and a substantially fixed voltage for correcting the tangential distortion; and at least one circuit element means connected with said regulator to bring about an additional predistortion of the control voltage so that when the linearity regulator is short-circuited the additional predistortion is eliminated.

7. In a circuit arrangement using a tube for producing a saw tooth shaped current curve for the magnetic deflection of one or several electron beams of a CRT, in which the radius of curvature of the picture screen is greater than its distance from the center of deflection, the output circuit including deflecting coils which present an ohmic load with an inductive component for the saw tooth current, and to the control grid of which is fed a saw tooth shaped control voltage, obtained through a periodic charge and discharge of a capacitor, predistorted through a frequency dependent negative feedback by means of a capacitive voltage divider, the improvement comprising a linearity regulator inserted between the tapping point of the capacitive voltage divider and a substantially fixed potential for correction of the tangential distortion, said linearity regulator being connected with at least one circuit element means bringing about an additional predistortion of the control voltage in such a manner that when the linearity regulator is short-circuited, the additional predistortion is minimal or is cut off.

8. A circuit arrangement according to claim 7, comprising a resistance connected as a shunt branch to the capacitive potential divider, the series connection of an adjustable and fixed resistance being connected in parallel with said shunt branch resistance, the tapping point of the series connection being connected over a capacitor with the anode of the tube.

9. In a circuit arrangement for producing a current having a saw tooth shaped curve for the deflection of an electron beam of a CRT wherein the radius of curvature of the screen is greater than its distance from the center of deflection, and including tube means having an anode and a control grid, an output stage for the tube means having deflecting coils presenting an ohmic load with an inductive component for the saw tooth current, load capacitor means connected to be periodically charged and discharged to apply to the control grid of the tube means a voltage having a saw tooth shaped curve, feedback means connected between the tube means anode and the tube means control grid for applying a frequency dependent negative feedback to the control grid for predistorting the saw tooth shaped control voltage and including two series connected capacitors, and a linearity regulator including a variable resistor connected from the connection point between the capacitors to a point of substantially fixed potential, the improvement comprising means connected to the tube anode and to the linearity regulator for applying a voltage from the anode to the linearity regulator in a substantially undistorted manner to provide an additional predistortion of the control voltage effective at the control grid of the tube for eliminating the tangential error, which voltage exceeds the amount to be used for linearizing the deflection current, said regulator having a short circuited position in which said anode voltage is substantially zero.

10. In a circuit arrangement for producing a current having a saw tooth shaped curve for the deflection of an electron beam of a CRT wherein the radius of curvature of the screen is greater than its distance from the center of deflection, and including tube means having an anode and a control grid, an output stage for the tube means having deflecting coils presenting an ohmic load with an inductive component for the saw tooth current, load capacitor means connected to be periodically charged and discharged to apply to the control grid of the tube means a voltage having a saw tooth shaped curve, feedback means connected between the tube means anode and the tube means control grid for applying a frequency dependent negative feedback to the control grid for predistorting the saw tooth shaped control voltage and including two series connected capacitors, and a linearity regulator including a variable resistor connected from the connection point between the capacitors to a point of substantially fixed potential, the improvement comprising coupling means for connecting the load capacitor to the tube means for providing an additional predistortion of the control voltage effective at the control grid of the tube means for eliminating the tangential error, which voltage exceeds the amount to be used for linearizing the deflection current, said coupling means being variable to vary the time constant thereof independently of the effect of negative feedback, said regulator having a short circuited position in which the additional predistortion of the control voltage is substantially zero.

References Cited by the Examiner

UNITED STATES PATENTS

| | | | |
|---|---|---|---|
| 2,621,309 | 12/52 | Faudell | 315—27 |

| | | | |
|---|---|---|---|
| 2,816,247 | 12/57 | Janssen et al. | 315—29 XR |
| 2,874,329 | 2/59 | Janssen et al. | 315—27 |
| 2,911,566 | 11/59 | Taylor et al. | |
| 2,923,851 | 2/60 | Washburn | 315—27 |

OTHER REFERENCES

IRE Dictionary of Electronics Terms and Symbols, Institute of Radio Engineers, New York, 1961, pp. 102, 130.

DAVID G. REDINBAUGH, *Primary Examiner.*

RALPH G. NILSON, *Examiner.*